United States Patent [19]

Cohly

[11] 3,885,054
[45] May 20, 1975

[54] EDIBLE COLLAGEN CASING CROSS-LINKED BY BISULFITE ADDITION

[75] Inventor: Mauj A. Cohly, Danville, Ill.
[73] Assignee: Tee-Pak, Inc., Chicago, Ill.
[22] Filed: Apr. 26, 1973
[21] Appl. No.: 354,727

[52] U.S. Cl. ............... 426/277; 426/105; 264/183; 264/209
[51] Int. Cl. ............................................ A22c 13/00
[58] Field of Search ........... 426/277, 278, 276, 514, 426/135; 138/118.1

[56] References Cited
UNITED STATES PATENTS

| | | | |
|---|---|---|---|
| 3,523,027 | 8/1970 | Hall | 426/277 |
| 3,620,775 | 11/1971 | Cohly | 426/277 |
| 3,695,904 | 10/1972 | Coleman | 117/12 |

FOREIGN PATENTS OR APPLICATIONS

| | | | |
|---|---|---|---|
| 46-6382 | 2/1971 | Japan | 426/277 |
| 315,752 | 1930 | United Kingdom | 99/175 |

Primary Examiner—Norman Yudkoff
Assistant Examiner—Hiram H. Bernstein
Attorney, Agent, or Firm—Neal J. Mosely; Russell L. Brewer

[57] ABSTRACT

An edible sausage casing characterized by a total absence of aldehyde functionality having improved stuffing, linking, cooking, and tear characteristics is prepared from hide collagen. Animal hides are swollen and dehaired and split to produce collagen from the corium layer. The corium is ground into fine particles, formed into a slurry, and swollen with acid to produce an extrudable collagen slurry having a solids content of about 2 – 6 percent. The slurry is extruded through an annular die, coagulated in a coagulating bath forming a gel casing, and hardened. The gel casing is cross-linked by reacting the masked pendant aldehyde groups in the collagen molecule with a bisulfite salt or its precursor under conditions favoring the formation of the bisulfite-aldehyde addition product. The bisulfite-aldehyde addition product is subsequently decomposed to generate the pendant aldehyde groups in their nascent state in situ, and the latter react to produce inter- and intra- cross-links in the collagen molecules that constitute the fibrils and fibers of the gel casing. The casing then is washed, dried, reeled, and eventually shirred on a commercial shirring machine for delivery to the meat packer.

11 Claims, No Drawings

EDIBLE COLLAGEN CASING CROSS-LINKED BY BISULFITE ADDITION

BACKGROUND OF THE INVENTION

Natural casings are prepared from the intestines of various edible animals, primarily cattle, hogs, and sheep. The intestines are removed from the slaughtered animal and are thoroughly cleaned by processes well known in the art. Natural casings, which have been thoroughly cleaned, are stuffed with various sausage meat compositions and formed into sausage links in preparation for cooking. The sausages which are thus formed are cooked by the consumer and the sausage casings eaten with the cooked sausage. In the preparation of certain smoked or precooked sausages, such as frankfurters and the like the sausage is cooked or smoked or otherwise processed by the meat packer to render it edible without further treatment by the consumer.

Prior to about 1925, substantially all sausage casings were natural casings prepared from animal intestines. Since that time there have been developed several types of synthetic sausage casings, principally of regenerated cellulose, which are used in the preparation of the major portion of sausages which are made and sold today. Cellulose casings are used in the preparation of large sausages, such as bolognas, salamis, and the like and are removed from the sausage by the consumer at the time of final preparation for eating. Regenerated cellulose casings are also used in the preparation of frankfurter sausages wherein the casing is stuffed with sausage emulsion, linked, smoked, and cooked, and the casing removed from the finished sausage.

Regenerated cellulose casings have not proven satisfactory for the processing of pork sausage inasmuch as cellulose is not edible with the sausage and does not transmit the fat which is released from the sausage during cooking. As a result there has been some demand for an artificial sausage casing which is edible and which has the properties desired in a casing to be used in the processing of pork sausages.

In the preparation of edible collagen casings, hide collagen is converted into a finely divided fibrillar form, formed into an aqueous collagen slurry, e.g., containing about 2 – 6 percent collagen and extruded as a thinwalled tube. The extruded collagen then is passed into a coagulating bath, typically ammonium sulfate or sodium sulfate, for dehydrating the collagen slurry and forming a coherent collagen film. At this stage in the process, the salt coagulated collagen film can be handled but will revert to a thin slurry upon further contact with water. It is, therefore, necessary to harden or tan the extruded collagen film to permit further processing of the film and to provide the film with sufficient strength for use as a sausage casing.

DESCRIPTION OF THE PRIOR ART

In the preparation of edible collagen casings, one satisfactory method of tanning involves the use of a bath containing a partially basic aluminum salt complex, such as a citrate complex, at a pH suitable for tanning.

It is also known that edible collagen casings can be tanned by treatment with various iron salts or with other transition metal salts provided that they are non-toxic. Collagen casings can also be tanned by treatment with non-toxic dialdehydes such as gluteraldehde. The dialdehyde tanning may also be used in combination with the aluminum tanning process wherein the extruded collagen casing is first tanned with an aluminum complex followed by final tanning with treatment with gluteraldehyde. Other non-toxic tanning agents may be used which are well known in the art. There has been an interest, for a variety of reasons, in the development of a casing process which would avoid completely the use of a tanning agent. This would avoid problems with respect to the effluent from the casing plant, etc.

SUMMARY OF THE INVENTION

This invention relates to an improvement in a conventional process for producing an edible collagen casing from a collagen source and the resulting product. Conventionally, the steps of preparing the casing comprised forming an extrudable collagen slurry, extruding the awueous collagen slurry through a die to form a collagen tube, coagulating the extruded tube by contacting with an aqueous coagulating medium, tanning the collagen tube, and drying to produce an edible casing.

The improvement in the process of this invention comprises hardening the collagen tube (as distinguished from tanning) by contacting the collagen tube with a bisulfite providing material under conditions for forming a bisulfite addition product, decomposing the bisulfite addition product thereby forming a reactable aldehyde which then reacts with other collagen molecules to cross-link the collagen.

The resultant edible collagen casing has substantially all of the aldehyde functionality reacted with functional groups in adjacent collagen molecules in order to harden the casing without tanning and is characterized by a total absence of aldehyde functionality.

This process has the advantages of eliminating the use of tanning agents which may present problems of toxicity or at least of governmental food regulations; simplifying the preparation of casing and avoiding problems of pollution with respect to the plant effluents; and producing a casing in which the collagen is hardened only by internal cross-linking of the collagen molecules without introduction of a cross-linking agent.

DESCRIPTION OF THE PREFERRED EMBODIMENTS

Collagen which is suitable for preparation of edible casings is usually obtained from bovine hides. Collagen is formed of a large number of fibers which in turn consist of a much greater number of fibrils of sub-microscopic size. Collagen fibrils have a diameter of the order of 10 – 50 angstroms and lengths ranging from several thousand up to several million angstroms. Recent patents describing the production of edible collagen casings have emphasized the necessity of using collagen source materials which have not been subjected to a liming treatment for the reason that the liming treatment allegedly prevents the bursting of the collagen fibers to release the fibrils which is necessary for the formation of fibrillar films. Later patents, however, teach that edible casings can be made from collagen sources subjected to liming. In practicing this invention, edible collagen casings can be prepared from collagen exposed to one liming treatment or collagen exposed to minimal liming in the processing.

If unlimed collagen is to be used in the preparation of the edible collagen casing, the unlimed hide, either fresh, frozen, or salt cured is defleshed and split. The hide split is next cut into small pieces and passed through a meat grinder until reduced to a very small size. The ground collagen then is swollen in a dilute solution of an organic acid such as lactic acid or citric acid to produce a slurry having a collagen content in the range from about 2 – 6 percent and preferably about 3.5 – 5 percent In copending U. S. Patent application of Noel I. Burke, Ser. No. 347,293, filed Apr. 2, 1973, a process is disclosed in which the collagen is first completely swollen with a concentrated solution of organic acid such as lactic and then ground into small pieces gy passing through a meat grinder. This process can also be used.

If the collagen to be used in the preparation of an edible casing is derived from limed animal hides, some variation in the above procedure is required. An animal hide is treated to remove the blood quickly and cut into suitable pieces (hide trimmings may also be used) for the subsequent liming treatment. The hide pieces are treated with a suitable lime solution for removal of hair. The treating solution contains excess solid lime together with sodium sulfhydrate and dimethylamine sulfate, or other promoters for the disingtegration of hair. The liming treatment is preferably for period of about 3 – 12 hours or less. The hides are removed and washed and then split to remove the epidermal layer and any remaining hair.

After splitting, the lime in the hides is neutralized by treatment with a non-toxic acid such as lactic acid, at a pH of from about 2.5 – 6.5 to form water-soluble calcium salts. The neutralized hide then is washed with water to remove most of the by-product salts. The defleshed and neutralized hide split or corium layer is cut into small pieces and ground in a meat grinder at a temperature less than about 20°C. to form a pulp. The pulp is treated with 1.5 – 3.5 percent lactic acid to permit swelling of the collagen. The swollen collagen then is mixed with sufficient water to produce a slurry having a collagen content in the range from about 2 – 6 percent and preferably 3.5 – 5 percent. As with the unlimed collagen, the process of Noel I. Burke, Ser. No. 347,293 may be used.

In preparation of tubular casing, the swollen collagen slurry obtained as described above from unlimed collagen or the minimally limed collagen is extruded through an annular die. Preferably, the collagen slurry is extruded through a die having counter-rotating inner or outer parts or both which is well known in the prior art in the preparation of collagen casings, as shown in Becker in U.S. Pat. No. 2,046,541.

The casing is extruded into a coagulating bath such as those consisting of a concentrated solution of sodium sulfate or ammonium sulfate and optionally containing from 0.1 – 1 percent NaOH for neutralization of acid. Any bath capable of coagulating the extruded collagen slurry to form a coherent film which is non-toxic can be used for practicing the invention. However, ammonium or sodium sulfate coagulating baths are most common and preferred.

A chemical hardening of the collagen casing is necessary to prevent the extruded casing from reverting to a paste on contact with water. The hardening is carried out as a three-step process. First, the collagen is contacted with a bisulfite providing material under conditions for forming a bisulfite addition produce with a carbonyl group. Subsequently, the collagen is treated to decompose the addition product. This regenerates bisulfite and aldehyde in a highly reactive form. The reactive aldehyde then reacts with adjacent collagen molecules to cross-link the gel collagen casing.

The bisulfite addition produce can be formed after the formation of the collagen slurry for extrusion although it generally is formed after extrusion of the slurry into a tubular casing. The bisulfite addition product preferably is formed simultaneously on coagulation of the extruded collagen slurry to form a coherent film. If the bisulfite addition product is formed prior to extrusion, a porous casing often is produced. Porosity sometimes results because inorganic salts remain in the casing on extrusion but then are leached from the casing with water during the wash cycle.

The bisulfite addition product with collagen can be carried out by following the procedures in practicing the well known bisulfite addition reaction to aldehydes and ketones. These addition products are formed by contacting the collagen with a bisulfite providing material such as an alkali metal bisulfite. Any non-toxic bisulfite providing material, including precursors, capable of forming a bisulfite addition product with an aldehyde or ketone can be used for practicing this invention. Typically, the bisulfite providing materials include ammonium bisulfite, sodium bisulfite, lithium bisulfite, potassium bisulfite, etc. precursors of bisulfite include alkali metal hydrosulfites including ammonium hydrosulfites which are reduced to alkali metal bisulfites and water and sulfurous acid and alkali metal sulfites.

The amount of bisulfite providing material necessary to form the bisulfite addition products with collagen is at least a stoichiometric quantity based on the aldehydic functional groups in the collagen. However, the desired proportion of addition products can be formed by passing the extruded casing in a bath containing from about 0.1 – 5 percent of bisulfite providing material by weight in water.

The bisulfite addition products of collagen, with aldehyde or ketone functionality, are formed at temperatures not exceeding about 35°C. If temperatures higher than 35°C. are employed, a decomposition of the collagen to gelatin often results, thereby rendering it unsuitable for casing or the casing itself is deformed and rendered unfit for sausage processing therein. Also, as is known, the bisulfite addition to carbonyl groups is reversible and particularly dependant on temperature. Therefore, temperatures of 0°– 30°C. are typically used.

The pH of the medium is also important and can be conducive to formation or decomposition of the decomposition product. The pH of the medium in which the bisulfite addition product is formed should be between about 5 – 8. When the pH of the medium falls substantially below about 5, e.g., 3, or rises substantially above 8, e.g., 10, a bisulfite addition product is not formed and further, it is decomposed if already formed. Thus, adjustment of pH is an effective means for regenerating the aldehyde for crosslinking collagen in forming the casing.

The bisulfite addition product is formed gy contacting the collagen in a vat containing from about 0.1 – 5 percent of the bisulfite providing material for a period of time at least sufficient to insure that substantially all of the reactable groups in collagen that can undergo bisulfite addition are converted to addition products. Periods of reaction longer than about 30 minutes are not normally required for formation. Usually from about 2 – 10 minutes are sufficient at an appropriate pH and temperature to form the addition product.

After the bisulfite addition product is formed, it is subsequently decomposed, thereby forming a reactable group which can crosslink with functional groups (presumably amine) in the collagen molecule. Decomposition of the bisulfite addition product can be accomplished in a variety of ways. Typically, the addition product is decomposed by an increasing of the temperature and by addition of acid or base to the medium. In the manufacture of collagen casing, it is important that the temperature for effecting decomposition not exceed about 50°C. and preferably 40°C. as the collagen casing is degraded to gelatin at even slight increases in temperature. Decomposition of the bisulfite addition product by the addition of acid can be effected provided that the pH does not fall substantially below about 2.5. It is well known in edible collagen casing manufacture that low pH mediums, e.g., below about 2.5, often affect the collagen molecule and sometimes effect deamidation thereof. Additionally, low pH mediums causes swelling of the collagen molecule and sometimes render the casing unsuitable for sausage manufacture. In a preferred method for decomposing the bisulfite addition product, the pH of the medium is raised to about $8 \pm 1$ and the temperature raised to about $40° \pm 5°C$. Decomposition of the bisulfite addition produce occurs rapidly when exposed to these conditions and the casing need not be held at this temperature for more than about 10 minutes. Longer times, however, are not detrimental.

On decomposition of the bisulfite addition product, a pendant reactable aldehyde and a dissociated bisulfite group is formed. The dissociated bisulfite group is washed away by the solution. The aldehyde formed then can undergo reaction with amine groups in the collagen molecule and thereby crosslink the collagen without use of a tanning agent. The reaction of the regenerated aldeyhde with the amine groups in collagen generally occurs substantially simultaneously when the pH of the medium is between about 7 and 9 and the temperature is about 35°– 50°C. When the pH of the medium is below 5, the reaction of aldehyde and amine group is slow to non-existant. Therefore, alkali should be added to effect reaction of the aldehyde and the amine group, thereby cross-linking the collagen molecule. Conditions for enabling an aldehyde group to react with an amine group are well known in the art and can be used in practicing this invention provided the conditions are not detrimental to the collagen molecule itself.

The edible collagen casing produced by the process is characterized by a total absence of aldehyde functionality. The aldehyde functionality in the collagen molecule is destroyed by the addition of the bisulfite reactant for forming the bisulfite addition products. This aldehyde functionality is regenerated on decomposition of the bisulfite addition product and is reacted with functional groups, e.g., amines, in adjacent collagen molecules to harden the casing. After hardening, the bisulfite by-product is washed out of the product with water to leave a casing hardened and free of a tanning agent.

To summarize the theory of the invention, it is believed that the bisulfite providing material when added to the collagen under appropriate conditions reacts with the carbonyl groups in collagen to form a bisulfite addition product which then can be decomposed under appropriate temperature and pH to regenerate the aldehyde and permit reaction with amine groups in the collagen molecule. As is published in the literature, collagen is a complex molecule comprising polypeptide chains of amino acid residues which include glycine, hydroxyproline and proline in unique ratios. A number of published papers have confirmed that pendant aldehyde functional groups are present in collagen to the extent of about 1 per unit of molecular weight or about 1 equivalent of aldehyde per $2 \times 10^6$ g of collagen. Evidence of aldehyde functionality is noted in that addition products of hydrazine, semicarbazide, and hydroxylamine can be with collagen. Even though the aldehyde functionality is present in extremely small concentration its function as noted by authorities is substantial with respect to the properties imparted to the molecule.

It is believed that the presence of bisulfite providing material under appropriate conditions for normally forming a bisulfite addition product breaks the masked aldehyde cross-linking bonds normally found in the collagen molecule to form a bisulfite addition product.

On exposure of the bisulfite addition products to conditions for decomposing them, new crosslink sites are generated and new crosslinks of aldehyde and amine are generated. Thus, a new set of characteristics are imparted to the collagen molecule, particularly in casing by the decomposition of the addition product and subsequent crosslinking.

With the above explanation as to the theory of the process, it is understandable that the collagen source be subjected to limited liming and preferably none. Liming tends to destroy the aldehyde functionality which is necessary for bisulfite addition. Generally, the destruction of such sites by the liming operation is accomplished in a period of time exceeding about one day and only partial destruction is noted when the liming period is 1 day or less and is substantially nonexistant when a liming period is from 3 – 12 hours.

The following examples are provided to illustrate preferred embodiments of the invention and are not intended to restrict the scope therof. All percentages are expressed as weight precentages and all temperatures are in degrees centigrade unless otherwise specified.

EXAMPLE 1

In this example, the preparation of edible collagen casings from short limed animal hides is illustrated.

Selected cattle hides from carcasses certified fit for human consumption, weighing about 65 – 75 pounds each, are the starting material for this process. As soon as possible after flaying and inspection, the hides are washed in a large volume of circulating cool (10°C.) water to remove adhering blood. After washing, the hides are fleshed fresh, without curing, to remove adhering fatty and muscular debris from the flaying operation.

The washed and fleshed hides are then treated in a liming bath containing 6 percent wt. of fresh calcium hydroxide and 1.5 percent wt. sodium sulfhydrate (the liming bath may contain up to 3 percent dimethylamine sulfate), as solution and/or slurry contained in about 450 percent wt. of water at room temperature (15°–20°C.), all percentages being calculated on the weight of the hide treated. The treatment is carried out for a period less than about 6 hours, sufficient to remove most of the hair from the hide, and the hides are gently agitated from time to time to insure even penetration of the liming liquor.

After liming, the hides are removed from the liming bath and permitted to drain for a period of one-half hour while suspended. The limed hides are then gently squeezed, as between rubber rollers, to remove excess liming liquor. The hides which have been thus limed drained, limed, squeezed are then cut or split in the plane of the hide into two approximately equal portions by weight. The upper or outer hide surface contains all of the hair, hair follicles, and sebaceous and sudorific glands. The inner or corium layer consists essentially of collagen. The outer or hair containing layer or split is discarded as unsuitable for use in the preparation of casing but may be used for the formation of leather laminates or coverings.

The corium layer or split is then placed in a tank or vat containing about 4.5 times the hide weight of water at a solution less than about 15°C. Gentle agitation is used to insure even removal of debris and adhering lime solution and/or slurry. The hides are washed during a period of 20 – 30 minutes. The washings are removed and the corium splits re-suspended in 4.5 times their weight of cool (15 °C.) water. Edible grade lactic acid, suitably diluted at a concentration of 2 – 4 ounces of 44 percent lactic acid per quart of cool (15°C.) water is added in small portions at 15 minute intervals, with gentle agitation for 5 minutes of each 15 minute period. The liquor is tested for pH before each addition, and the end point is regarded as the point when the pH is permanently depressed below 7.0. In general, this requires about 1.5 percent of the 44 percent lactic acid, based on the weight of the corium splits. This treatment is effective to neutralize the excess lime in the corium layer and to remove it as a soluble salt. The rate of addition of the lactic acid solution is carefully regulated so that the temperature of the bath is never permitted to rise above about 32°C.

The neutralized and delimed corium splits are then removed from the neutralization bath, drained and rinsed in cool (15°C.) water and packed in stainless steel drums. The splits are maintained in refrigerated condition, i.e., about 5°C. during storage and/or shipment prior to conversion of the casing. It should be noted, however, that the hides may, if desired, be cut into small pieces or small pieces of scrap hide material may be used in the steps of liming, splitting, and neutralization or deliming.

The delimed corium splits are cut into small square or rectangular sections, e.g., ¼ to 4 square inches, in preparation for grinding. The small pieces of treated hide are converted to a fine pulp by successive passes through a meat grinder. In this grinding operation, sufficient ice is mixed with the hide splits to maintain the temperature below about 20°C. (and preferably below about 10°C.). Successive passes through the meat grinder are made using successively small dies, the smallest being about 3/64 inch. At this point, the mixture is adjusted by addition of water to bring the water content of the slurry to about 90 – 95 percent by weight.

The collagen slurry or pulp then is treated with sufficient dilute lactic acid (other dilute or weak acids such as citric or acetic acid may be used) to produce a medium having a pH of about 2.5 – 3.7. The acid is usually added as a dilute solution, e.g., about 0.8 – 2.0 percent. After thorough mixing, the pulp and acid are stored overnight at a temperature of about 3°C. to swell. At the end of this time the collagen is swollen and has taken up all of the water in the slurry. The swollen collagen is then mixed with sufficient water and acid to maintain the pH of 2.5 – 3.7, thus producing a thin homogeneous slurry consisting of about 4 percent collagen and 1.2 percent lactic acid.

The swollen collagen slurry is passed through a high speed shear mixer, e.g., a Votator, and then a homogenizer to further disperse the fibers and then is filtered through a 7 mil bar filter to remove any undispersed fiber clumps or other solid contaminants. The paste is generally deaerated by storage under vacuum prior to extrusion. The homogenized and filtered collagen slurry is pumped under pressure through an extrusion die, as previously described, into a coagulating and tanning bath consisting of about 40 percent ammonium sulfate (sodium sulfate can also be used) and about 1 percent sodium bisulfite in water. The pH of the bath is about 6 ± 0.5 and the temperature is about 25°C. When the collagen is extruded as a thin-walled tube into this concentration of ammonium sulfate, the collagen fibrils are dehydrated and collapse to form a film which is sufficiently coherent for further processing. To insure proper coagulation of the casing, both on the inside and the outside, the bath is circulated both inside and outside the tube while the tube is maintained in an inflated condition.

After the gel casing is coagulated in the ammonium sulfatesodium bisulfite solution, it is removed and hardened by passing the coagulated casing into a second bath consisting of a saturated solution of ammonium sulfate in water, adjusted to a pH of about 8.5 with NaOH, and at a temperature of about 40°C. Passage of the coagulated casing into this bath decomposes the bisulfite addition product formed in the first bath and substantially simultaneously effects cross-linking of the collagen molecule via the regenerated aldehyde groups.

The tanned casing then is removed from the bath and washed with water at room temperature (25°C.) to remove the water-soluble salts from the casing. This washing also removes any unreacted treating reagent. The casing then is passed through a plasticizing bath consisting of an aqueous solution of glycerin (or equivalent plasticizer such as sorbitol, dipropylene glycol, triethylene glycol, etc.). After the casing leaves the plasticizing bath, it is dried while in an inflated condition, shirred, and packaged.

Two sets of physical properties of the casing were determined one under rewet conditions and the other after it was conditioned. A rewet casing is the casing taken from the dryer and immersed in water. A conditioned casing is obtained by maintaining a casing in a room at 75°F. and a relative humidity of 62 percent until humidified. Thickness measurements and tensile strengths are on a single wall of the casing. Table 1 below represents physical data for the rewet and conditioned casings.

TABLE 1

| THICKNESS OF WALL | | REWET | CONDI-TIONED |
|---|---|---|---|
| Wet | | 2.4 Mils | |
| Dry | | 1.4 Mils | 1.4 Mils |
| Instron Data: | | | |
| Longit: | Break (lbs/in) | | |
| | Avg. | 2.4 | 6.0 |
| | Tensile (psi) | 1000 | 4286 |
| | Modulus (psi) | 2941 | 11279 |
| | Elongation (%) | | |
| | Avg. | 34 | 38 |
| Trans: | Break (lbs/in) | | |
| | Avg. | 2.7 | 5.9 |
| | Tensile (psi) | 1125 | 4214 |
| | Modulus (psi) | 2500 | 7951 |
| | Elongation (%) | | |
| | Avg. | 45 | 53 |

Surprisingly, the tensile strengths in both the longitudinal and transitional direction were substantially the same or isotropic for both the rewet casing and the conditioned casing. The rewet casing had a tensile strength of 1,000 psi in the longitudinal direction and 1,125 psi in the transitional direction. The conditioned casing had a tensile strength of 4,286 psi in the longitudinal direction and a tensile strength of 4,214 psi in the transitional direction. For purposes of comparison, a typical casing made by the process described above but omitting the bisulfite treatment and using a prior art, commercial, aluminum sulfate (olated, partially basic) tanning solution for hardening, has rewet tensile strengths of 900 – 1,100 psi longitudinal, and 600 – 900 psi transverse.

EXAMPLE 2

Edible collagen casing is prepared from unlimed collagen as follows.

Fresh steer hides are washed with cold water at 60°C. or less in a rotating drum for 10 – 24 hours. After washing, the hides are defleshed with a scraping machine and the hair and epidermis are cut off with a horizontal band knife. The remaining hair and poorly cleaned sections are cut-off by hand and composites prepared from five hides. The hide composites then are cut into ½ – 4 square inch sections and reduced to pulp by successive passes through a meat grinder, each pass being a finer grind. In a three-pass meat grinder, the first, second, and third passes are about 18, 8, 1.5 mm. in diameter. The termperature of the pulp is maintained below 20°C. during grinding by adding crushed ice to the hides as they are fed to the grinder.

The ground pulp is diluted with water to give a smooth slurry containing about 6 percent solids. This slurry then is treated with 2.4 percent lactic acid until the pH is between about 2.5 and 3.7 to form a homogeneous mass of swollen collagen fibrils. The mixture obtained contains about 3.7 percent hide solids and 1.2 percent lactic acid. After the pulp is blended with acid and the collagen swollen, it is passed through a high speed shear mixer, e.g., a Votator, and then a homogenizer. The mixed product is filtered through a 7 mil bar filter to remove any agglomerates formed during homogenization.

The swollen collagen slurry is extruded through the same die used in Example 1 into a bath containing 40 percent ammonium sulfate and 0.1 percent sodium bisulfite. The bath has a pH of 6 ± 1 and is at a temperature of 20°– 25°C. The casing is allowed to remain in the bath for about 1 – 5 minutes. It is then removed and passed into a second bath of saturated ammonium sulfate in water maintained at a pH of about 8. The pH is achieved by addition of small amounts of caustic soda for effecting neutralization of the acid in the casing. The temperature of the bath is 40°– 45°C. and is effective for decomposing the aldehyde bisulfite addition product and effecting cross-linking of the collagen molecule through the regenerated aldehyde units. The casing is maintained in this bath for about 1 – 5 minutes and then removed where it is washed with water, plasticized, and dried as in Example 1.

The casing has isotropic physical properties and it has excellent characteristics with regard to linking.

EXAMPLE 3

In this example, the process described in Example 2 is repeated except that 5 percent sodium bisulfite is used in place of the 1 percent sodium bisulfite. The other process steps remain the same. After drying, the casing is evaluated and is found to have substantially isotropic physical properties and has desirable strength characteristics in both the transverse and longitudinal direction for making an edible casing.

EXAMPLE 4

In this example, the process described in Example 2 is repeated except that a bisulfite precursor, namely sodiumhydrosulfite, in a proportion of 1 percent is substituted for the sodium bisulfite. The precursor is converted to bisulfite in situ. Other process steps remain the same. After drying the casing, physical tests show that the transverse and longitudinal strengths are extremely desirable for casing and the characteristics are substantially isotropic. The casing possesses a fine sheen and passes linking and frying tests.

While the foregoing examples involve the formation of a bisulfite addition compound with aldehyde functionality which is naturally present in collagen, the process will function equally well with chemically introduced aldehyde functionality. Thus, additional aldehyde functionality may be created by reduction of carboxyl group, oxidation of primary alcohol groups, or grafting of groups having pendant aldehyde functionality. The aldehyde functionality in the collagen, from whatever source, will undergo the reversible reaction with bisulfite as described above.

I claim:

1. In a process for producing an edible collagen casing which comprises extruding an aqueous collagen slurry through a die into an aqueous coagulating medium to form a thinwalled tubular collagen casing, hardening the tubular casing, and drying to produce an edible casing product, the improvement for hardening said tubular collagen casing which comprises:

forming a bisulfite addition product with said collagen by contacting said collagen with a bisulfite providing material selected from the group consisting of alkali metal and ammonium sulfite, alkali metal and ammonium bisulfite, alkali metal and ammonium hydrosulfite, and sulfurous acid at a pH and temperature effective for forming said bisulfite addition product, and subsequently decomposing said bisulfite addition product to form a reactive aldehyde which then reacts with functional groups on said collagen to crosslink and harden the thinwalled tubular collagen casing.

2. The process of claim 1 wherein collagen is contacted with said bisulfite providing material under conditions for forming a bisulfite addition product after the collagen slurry has been extruded into a casing.

3. The process of claim 2 wherein the temperature for forming said bisulfite addition product is from about 0° – 40°C.

4. The process of claim 3 wherein said extruded collagen tubular casing is immersed in a bath containing from about 0.1 – 5 percent of bisulfite providing material in water.

5. The process of claim 4 wherein said collagen tubular casing is contacted with said bisulfite providing material for a time of from about 2 – 30 minutes.

6. The process of claim 5 wherein said pH of said bath is from about 5 – 7.

7. The process of claim 6 wherein after said bisulfite addition product is formed under conditions for forming said product, it is decomposed by raising the pH to about 7 – 9 and the temperature raised to about 35°–50°C. for substantially simultaneously forming a reactable aldehyde and cross-linking said aldehyde with functional groups on said collagen.

8. The process of claim 7 wherein said bisulfite providing material is an alkali metal bisulfite or ammonium bisulfite.

9. The process of claim 8 wherein said alkali metal bisulfite is sodium or potassium bisulfite.

10. The process of claim 7 wherein said bisulfite providing material is an alkali metal or ammonium hydrosulfite.

11. In a process for producing an edible tubular collagen casing for the processing of sausages therein which comprises forming an acid swollen collagen slurry, extruding the slurry through an annular die into a coagulating bath to form an extruded tubular casing, plasticizing and drying, the improvement for hardening without tanning said collagen casing which comprises:

passing the extruded tubular casing into a bath containing from about 0.05 – 5 percent of alkali metal bisulfite or ammonium bisulfite, the bath having a pH of from about 5 – 7 and a temperature between about 0° – 35°C. for about 2 – 30 minutes for coagulation of the extruded casing and then passing the coagulated casing into another bath having a pH between about 7 and 9 and maintained at a temperature of between about 35° and 50°C. for effecting decomposition of the bisulfite addition product and cross-linking of the collagen molecule to form an edible tubular collagen casing.

* * * * *